J. B. HERRESHOFF, Jr.
PROCESS OF TREATING SLAGS.
APPLICATION FILED APR. 9, 1915.
1,231,349.
Patented June 26, 1917.
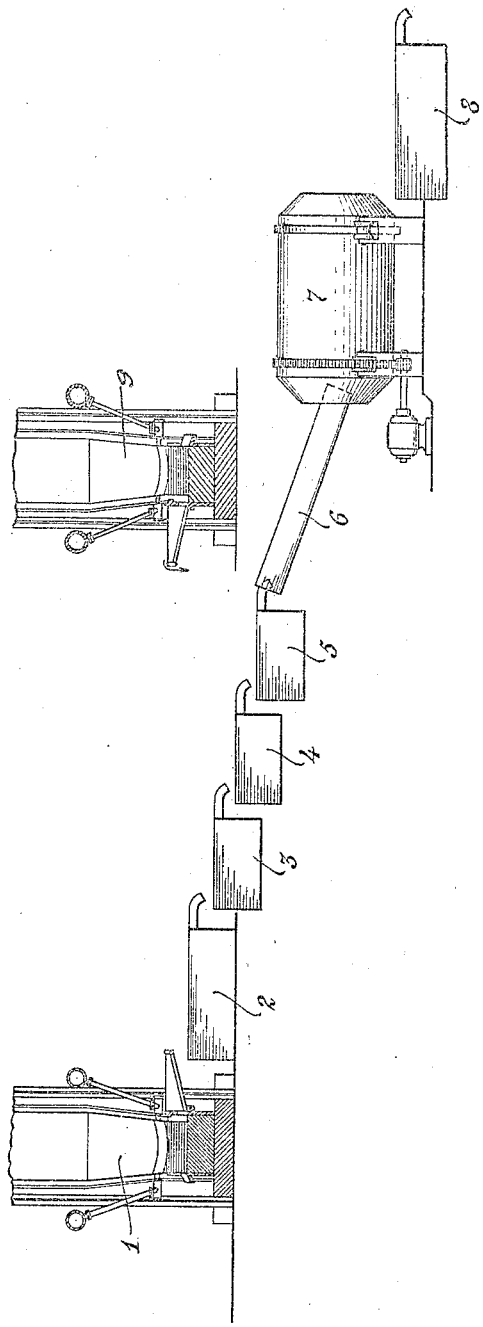
WITNESSES
G. V. Rasmussen
John A. Ferguson
INVENTOR
JAMES B. HERRESHOFF Jr.
BY
Briesen Knauth
ATTORNEYS

UNITED STATES PATENT OFFICE.

JAMES BROWN HERRESHOFF, JR., OF NEW YORK, N. Y.

PROCESS OF TREATING SLAGS.

1,231,349.   Specification of Letters Patent.   Patented June 26, 1917.

Application filed April 9, 1915. Serial No. 20,149.

*To all whom it may concern:*

Be it known that I, JAMES BROWN HERRESHOFF, Jr., a citizen of the United States, and a resident of the borough of Queens, city and State of New York, have invented a certain new and useful Process of Treating Slags, of which the following is a specification.

My invention relates to the treatment of metallurgical slags which have associated therewith either chemically or mechanically a proportion of the metal ingredients of the molten mass from which the slag was produced or with which it was last in contact and from which it has been removed. The object of my invention is to recover in whole or in part from these slags associated or contained metallic ingredients obtained from the molten mass, the invention having especially important application in such cases in which the slag carries with it relatively very valuable metallic ingredients.

My new process consists, broadly stated, in mixing, by which I include washing or otherwise bringing into intimate contact, a molten slag containing such metal ingredients desired to be recovered and a molten material consisting of metals or metal compounds or mixtures thereof, which contains a smaller percentage of such metal ingredients than the molten mass from which the slag has been removed, this definition being meant to include, of course, a molten material which is wholly free from said ingredients.

The removal of the metal values from the slag in this way may be wholly a mechanical action, but in some cases the molten material may be selected so as to react chemically with the metal values, or some of them, which are contained in the slag and in such cases the action will be either wholly chemical or partly mechanical and partly chemical.

The molten material may be produced in any suitable way. For example, it may be produced partly or wholly by treating the molten slag with reducing agents, such as reducing gases or it may be obtained by smelting operations. The mixing of the slag and the molten material may also be accomplished in any suitable manner. The slag may, for instance, be caused to fall upon the surface of and thus penetrate into the molten material in a suitable container, or these substances may be agitated as in a rotary mechanical device or by stirrers or mixing may be produced by passing gases through these substances, or causing the substances to flow together through a long trough.

In order to illustrate my invention fully and completely, I will now describe it more specifically and particularly, as applied to the metallurgy of copper and in doing so reference will be made to the accompanying drawing which shows schematically an arrangement of apparatus by the use of which the process may be carried out. Copper slags, that is slags obtained from converters or from reverberatory or smelting furnaces are principally silicates of iron, but they all have associated therewith copper values and in most cases they also carry gold and silver. Copper smelter slag, for example, which is principally an iron silicate, contains besides small quantities of gold and silver, copper in the form of copper silicate, and of copper matte mechanically entangled with the iron silicate and dissolved therein. The amount of such ingredients depends of course upon the grade of the matte produced by the smelter. In general the percentage of copper contained in the slag is about 1% of the percentage of copper in the matte produced by the smelter. If the smelter is so operated and conditions are so maintained that a matte containing 60% of copper is produced, the percentage of copper in the slag is about .6%; with a 40% matte the slag loss is about .4% copper.

Employing the apparatus illustrated, the smelter slag produced by the smelting furnace 1, which also produces, say, 60% matte is run into a series of settling tanks 2, 3, 4 and 5. The tank 2 will contain the 60% matte of the furnace but in the tanks 3, 4 and 5 is placed a molten bath consisting of a low grade matte, *i. e.* a molten material containing a smaller percentage of copper than the original 60% matte, and in each tank 3, 4 and 5 is placed a lower grade of matte than the preceding tank contains. For example, tank 3 may contain 20% matte, tank 4, 10% matte and tank 5, 8% matte. The slag and matte from the furnace 1 discharges into the tank 2 and the slag separates out on top; the slag overflows and drops into the tank 3 and mixes with the 20% matte therein and thus loses a part of its contained copper; after part of the contained copper, and with it, of course, gold and silver, is recovered in this manner in tank 3, the slag in its then condition overflows into tank 4 and because of the still lower grade of matte in tank 4 a further removal of copper from the slag is effected. In like manner a further removal is effected in tank 5 and also in the long trough 6 down which, together with the purified slag, a still lower grade of matte, say 5%, is run. This matte may be supplied by the smelting furnace 9. From the trough 6, the slag and 5% matte discharge into the rotary mixer 7. The mixer may be of any suitable construction, preferably being provided, like the tanks and trough with a refractory lining, and may be rotated in any suitable manner. From the mixer 7 the slag and matte flow into the settling tank 8, from which the slag and matte may be drawn off separately. The process may be conducted wholly or partly continuously or intermittently.

The low grade matte may be mixed sufficiently with the slag in one or more of the tanks 3, 4 and 5 and the resulting slag may be sufficiently free from copper for all practical purposes. Or the long trough 6 may accomplish the desired removal of contained copper without the tanks and the rotary mixer or a part of these elements. Or the mixer 7 may be used without the other elements.

The tanks, trough, mixer and settling tank may be heated, as by the combustion of coal, charcoal or oil, so as to maintain the contents in liquid condition and preferably also so as to maintain a neutral or reducing atmosphere in contact with the materials being treated.

The slag in the settling tank 8 will contain about 1% of the percentage of copper in the settling tank matte in accordance with the general rule expressed above. Accordingly, if a 5% treating matte has been employed in the mixer 7, the copper in the slag will be about .05% although before treatment it contained .6% copper. The saving of .55% copper, and equivalent amounts of gold and silver, thus effected, makes the process very valuable commercially. The process is capable of effecting important economies also in the production of the matte, or other material from which the original slag was obtained. For example, the copper blast furnaces or reverberatory furnaces or converters can advantageously be run with richer reguli and more silicious slags so that both the cost of flux and of converting will be reduced. The larger metal values associated with the slag incidental to such a method of operation will not represent a loss, as heretofore, but can be recovered by my process.

If desired, the slag from the 5% matte of the settling tank 8 may be conveyed into another tank and there mixed with a still lower grade of matte, and then allowed to settle out and this process may be continued indefinitely, using in each case a lower grade of matte, until practically all of the metal values of the original slag have been extracted.

The low grade matte will upon mixing, wash out and thus replace the high grade matte associated with the slag; it will also chemically react upon the copper in the slag in the form of copper silicate so as to substitute iron for the copper thereof. The process is largely mechanical in its action, but, as I have shown, it may act chemically as well. The low grade matte of the mixing operation is gradually enriched in copper, and measurably also in gold and silver, and after a time should be replaced by matte of a lower grade; this may be accomplished by transferring the matte of each receptacle to the receptacle immediately before it in the treating series.

The above process as set forth in connection with copper metallurgy, can readily be applied advantageously to the metallurgy of other metals, such as gold, silver, tin, lead, nickel and cobalt. In gold or silver metallurgy, metallic lead may be used as the molten material corresponding with the low grade matte used in the copper process described above. In tin metallurgy a slag composed mainly of iron or calcium silicate, but containing tin silicate, is produced; with such a slag a molten material such as molten pig iron would preferably be employed, in which case iron, free or in combination with tin, will react with the tin silicate of the slag with the production of tin which would dissolve in the iron and iron silicate which goes into the slag. In lead metallurgy, the smelting process would preferably be conducted with excessive amounts of lead silicate in the slag so as to produce a purer lead bullion than is obtained in the ordinary and usual processes wherein the slag loss must be kept as low as possible. The high metal values in the slag, in the shape of this excessive lead silicate, can readily be recovered by my process in which low grade lead matte would preferably be used as molten material.

I claim:

1. The process of recovering the metallic content from metallurgical slags, which comprises agitating the slag with a molten material containing a different percentage of metallic content than said slag.

2. The process of recovering the metallic content from metallurgical slags, which comprises agitating the slag with a molten material containing a smaller percentage of metallic content than said slag.

3. The process of recovering from metallurgical slags a contained metallic ingredient of the molten mass from which the slag has been removed, which comprises mechanically washing the molten slag with a molten material containing a smaller percentage of such ingredient than the said molten mass, substantially as and for the purpose described.

4. The process of recovering from metallurgical slags a contained metallic ingredient of the molten mass from which the slag has been removed, which comprises mechanically washing the molten slag with a series of baths of molten material containing a smaller percentage of such ingredient than the said molten mass, and each bath of the series containing a smaller percentage of such ingredient than the bath immediately preceding in the series, substantially as and for the purpose described.

5. The process of recovering from copper metallurgical slags copper, contained therein, of the copper matte from which the slag has been removed, which comprises mechanically washing the molten slag with a copper matte containing a smaller percentage of copper than said first mentioned copper matte, substantially as and for the purpose described.

6. The process of recovering from copper metallurgical slags copper, contained therein, of the copper matte from which the slag has been removed, which comprises mechanically washing the molten slag with a series of baths of copper matte containing a smaller percentage of copper than said first mentioned copper matte, each bath of the series containing a smaller percentage of copper than the bath immediately preceding in the series, substantially as and for the purpose described.

7. The process of recovering from metallurgical slags a metallic ingredient of the molten mass from which slag has been removed, which comprises projecting molten slag into a molten material containing a different percentage of such ingredient than the said molten mass, substantially as and for the purpose described.

In testimony whereof, I have hereunto set my hand in the presence of two subscribing witnesses.

JAMES BROWN HERRESHOFF, Jr.

Witnesses:
JOHN A. FERGUSON,
FRITZ ZIEGLER, Jr.